United States Patent
Benning et al.

(10) Patent No.: US 7,035,599 B2
(45) Date of Patent: Apr. 25, 2006

(54) BIASED PHASE SWEEP TRANSMIT DIVERSITY

(75) Inventors: Roger David Benning, Long Valley, NJ (US); R. Michael Buehrer, Morristown, NJ (US); Robert Atmaram Soni, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 974 days.

(21) Appl. No.: 09/918,393

(22) Filed: Jul. 30, 2001

(65) Prior Publication Data

US 2003/0022641 A1   Jan. 30, 2003

(51) Int. Cl.
*A04B 1/02* (2006.01)

(52) U.S. Cl. ............... 455/101; 455/103; 455/118; 455/295; 455/296; 455/301; 455/302; 455/303

(58) Field of Classification Search ........... 455/42, 455/118, 101, 127.1, 127.5
See application file for complete search history.

(56) References Cited

U.S. PATENT DOCUMENTS

| | | | | |
|---|---|---|---|---|
| 5,584,057 A | * | 12/1996 | Dent ............................. | 455/101 |
| 6,594,473 B1 | * | 7/2003 | Dabak et al. ................. | 455/101 |
| 6,704,370 B1 | * | 3/2004 | Chheda et al. ............... | 375/299 |
| 6,788,661 B1 | * | 9/2004 | Ylitalo et al. ................ | 370/334 |

FOREIGN PATENT DOCUMENTS

WO   WO 00/51265   8/2000

OTHER PUBLICATIONS

Alberto Gutierrez, et al "An Introduction to PSTD for IS-95 and cema2000", *IEEE Wireless Communications and Networking Conference*(Sep. 21, 1999), pp. 1358-1362.
Bing D. Su, et al, "Phase Sweeping Transmitter Diversity in Mobile Communications", *Vehicular Technology Conference*, (Apr. 28, 1996), pp. 131-135.
Ashvin Chheda, "On the Forward Link Capacity of a cdma2000-1X System with Transmit Diversity", *IEEE VTS 52nd,* (Sep. 24, 2000) pp. 618-623.
Akira Hiroike, et al, Combined Effects of Phase Sweeping Transmitter Diversity and Channel Coding, *IEEE Transactions on Vehicular Technology, IEEE Inc.* NY, US, vol.41, No. 2, (May 1992), pp. 170-176.
European Search Report.

* cited by examiner

*Primary Examiner*—Ahmad F. Matar
*Assistant Examiner*—Marie C. Ubiles
(74) *Attorney, Agent, or Firm*—Jimmy Goo

(57) ABSTRACT

Disclosed is a method and apparatus of transmit diversity that is backward compatible and does not significantly degrade performance in additive white guassan noise (AWGN) conditions using a transmission architecture that incorporates a form of phase sweep transmit diversity (PSTD) referred to herein as biased PSTD. Biased PSTD involves transmitting a signal and a frequency swept version of the same signal over diversity antennas at different power levels. By transmitting the two signals at different power levels, the depths of nulls normally seen in AWGN conditions when PSTD is utilized is reduced and performance degradation in AWGN conditions is mitigated.

20 Claims, 2 Drawing Sheets

10

20

BIASED PHASE SWEEP TRANSMIT DIVERSITY

RELATED APPLICATION

Related subject matter is disclosed in the following applications filed concurrently and assigned to the same assignee hereof: U.S. patent application Ser. No. 09/918,391 entitled, "Space Time Spreading and Phase Sweep Transmit Diversity," inventors Roger Benning, R. Michael Buehrer, Robert Atmaram Soni and Paul A Polakos; U.S. patent application Ser. No. 09/918,392 entitled, "Symmetric Sweep Phase Sweep Transmit Diversity," inventors Roger Benning, R. Michael Buebrer, Paul A Polakos and Mark Kraml; U.S. patent application Ser. No. 09/918,086 entitled, "Split Shift Phase Sweep Transmit Diversity," inventors Roger Benning, R. Michael Buehrer, Robert Atmaram Soni and Paul A Polakos.

BACKGROUND OF THE RELATED ART

Performance of wireless communication systems is directly related to signal strength statistics of received signals. Third generation wireless communication systems utilize transmit diversity techniques for downlink transmissions (i.e., communication link from a base station to a mobile-station) in order to improve received signal strength statistics and, thus, performance. Two such transmit diversity techniques are space time spreading (STS) and phase sweep transmit diversity (PSTD).

FIG. 1 depicts a wireless communication system 10 employing STS. Wireless communication system 10 comprises at least one base station 12 having two antenna elements 14-1 and 14-2, wherein antenna elements 14-1 and 14-2 are spaced far apart for achieving transmit diversity. Base station 12 receives a signal S for transmitting to mobile-station 16. Signal S is alternately divided into signals $s_e$ and $s_o$, wherein signal $s_e$ comprises even data bits and signal $s_o$ comprises odd data bits. Signals $s_e$ and $s_o$ are processed to produce signals $S^{14-1}$ and $S^{14-2}$. Specifically, $s_e$ is multiplied with Walsh code $w_1$ to produce signal $s_e w_1$; a conjugate of signal $s_o$ is multiplied with Walsh code $w_2$ to produce signal $s_o^* w_2$; signal $s_o$ is multiplied with Walsh code $w_1$ to produce $s_o w_1$; and a conjugate of signal $s_e$ is multiplied with Walsh code $w_2$ to produce $s_e^* w_2$. Signal $s_e w_1$ is added to signal $s_o^* w_2$ to produce signal $S^{14-1}$ (i.e., $S^{14-1} = s_e w_1 + s_o^* w_2$) and signal $s_e^* w_2$ is subtracted from signal $s_o w_1$ to produce signal $S^{14-2}$ (i.e., $S^{14-2} = s_o w_1 - s_e^* w_2$). Signals $S^{14-1}$ and $S^{14-2}$ are transmitted at substantially equal or identical power levels over antenna elements 14-1 and 14-2, respectively. For purposes of this application, power levels are "substantially equal" or "identical" when the power levels are within 1% of each other.

Mobile-station 16 receives signal R comprising $\gamma_1(S^{14-2})+\gamma_2(S^{14-2})$, wherein $\gamma_1$ and $\gamma_2$ are distortion factor coefficients associated with the transmission of signals $S^{14-1}$ and $S^{14-2}$ from antenna elements 14-1 and 14-2 to mobile-station 16, respectively. Distortion factor coefficients $\gamma_1$ and $\gamma_2$ can be estimated using pilot signals, as is well-known in the art. Mobile-station 16 decodes signal R with Walsh codes $w_1$ and $w_2$ to respectively produce outputs:

$$W_1 = \gamma_1 s_e + \gamma_2 s_o \quad \text{equation 1}$$

$$W_2 = \gamma_1 s_o^* - \gamma_2 s_e^* \quad \text{equation 1a}$$

Using the following equations, estimates of signals $s_e$ and $s_o$, i.e., $\hat{S}_e$ and $\hat{S}_o$, may be obtained:

$$\hat{S}_e = \gamma_1^* W_1 - \gamma_2 W_2^* = s_e(|\gamma_1|^2 + |\gamma_2|^2) + \text{noise} \quad \text{equation 2}$$

$$\hat{S}_o = \gamma_2^* W_1 + \gamma_1 W_2^* = s_o(|\gamma_1|^2 + |\gamma_2|^2) + \text{noise} \quad \text{equation 2a}$$

However, STS is a transmit diversity technique that is not backward compatible from the perspective of the mobile-station. That is, mobile-station 16 is required to have the necessary hardware and/or software to decode signal R. Mobile-stations without such hardware and/or software, such as pre-third generation mobile-stations, would be incapable of decoding signal R.

By contrast, phase sweep transmit diversity (PSTD) is backward compatible from the perspective of the mobile-station. FIG. 2 depicts a wireless communication system 20 employing PSTD. Wireless communication system 20 comprises at least one base station 22 having two antenna elements 24-1 and 24-2, wherein antenna elements 24-1 and 24-2 are spaced far apart for achieving transmit diversity. Base station 22 receives a signal S for transmitting to mobile-station 26. Signal S is evenly power split into signals $s_1$ and $s_2$ and processed to produce signals $S^{24-1}$ and $S^{24-2}$, where $s_1 = s_2$. Specifically, signal $s_1$ is multiplied by Walsh code $w_k$ to produce $S^{24-1} = s_1 w_k$, where k represents a particular user or mobile-station. Signal $s_2$ is multiplied by Walsh code $w_k$ and a phase sweep frequency signal $e^{j2\pi f_s t}$ to produce $S^{24-2}$, i.e., $S^{24-2} = s_2 w_k e^{j2\pi f_s t} = s_1 w_k e^{j2\pi f_s t} = S^{24-1} e^{j2\pi f_s t}$, where $f_s$ is a phase sweep frequency and t is time. Signals $S^{24-1}$ and $S^{24-2}$ are transmitted at substantially equal power levels over antenna elements 24-1 and 24-2, respectively. Note that the phase sweep signal $e^{j2\pi f_s t}$ is being represented in complex baseband notation, i.e., $e^{j2\pi f_s t} = \cos(2\pi f_s t) + j \sin(2\pi f_s t)$. It should be understood that the phase sweep signal may also be applied at an intermediate frequency or a radio frequency.

Mobile-station 26 receives signal R comprising $\gamma_1 S^{24-1} + \gamma_2 S^{24-2}$. Simplifying the equation for R results in $$R = \gamma_1 S^{24-1} + \gamma_2 S^{24-1} e^{j2\pi f_s t} \quad \text{equation 3}$$

$$R = S^{24-1} \{\gamma_1 + \gamma_2 e^{j2\pi f_s t}\} \quad \text{equation 3a}$$

$$R = S^{24-1} \gamma_{eq} \quad \text{equation 3b}$$

where $\gamma_{eq}$ is an equivalent channel seen by mobile-station 26. Distortion factor coefficient $\gamma_{eq}$ can be estimated using pilot signals and used, along with equation 3b, to obtain estimates of signal $s_1$ and/or $s_2$.

In slow fading channel conditions, PSTD improves performance (relative to when no transmit diversity technique is used) by making the received signal strength statistics associated with a slow fading channel at the receiver look like those associated with a fast fading channel. However, in additive white gaussan noise (AWGN) conditions, PSTD can significantly degrade performance. Accordingly, there exists a need for a transmit diversity technique that is backward compatible without significantly degrading performance in AGWN conditions.

SUMMARY OF THE INVENTION

The present invention is a method and apparatus of transmit diversity that is backward compatible and does not significantly degrade performance in additive white guassan noise (AWGN) conditions using a transmission architecture that incorporates a form of phase sweep transmit diversity (PSTD) referred to herein as biased PSTD. Biased PSTD involves transmitting a signal and a frequency swept version of the same signal over diversity antennas at different power levels. By transmitting the two signals at different power levels, the depths of nulls normally seen in AWGN conditions when PSTD is utilized is reduced and performance degradation in AWGN conditions is mitigated.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
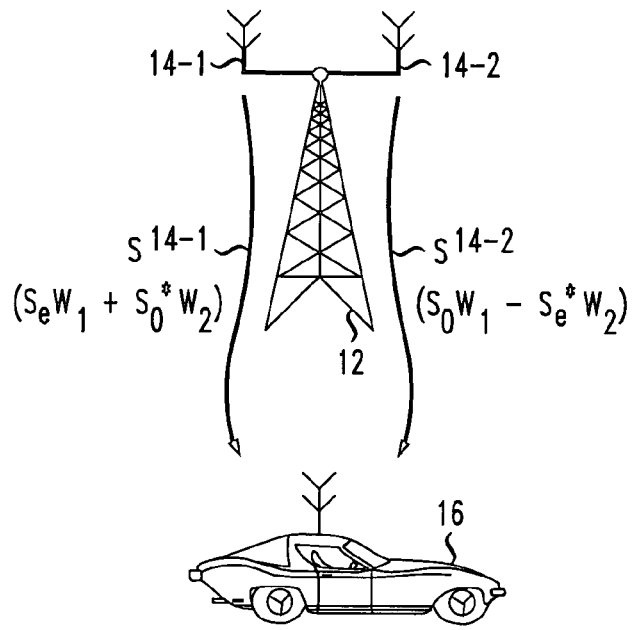
FIG. 1 depicts a wireless communication system employing space time spreading techniques in accordance with the prior art.
Figure 2:
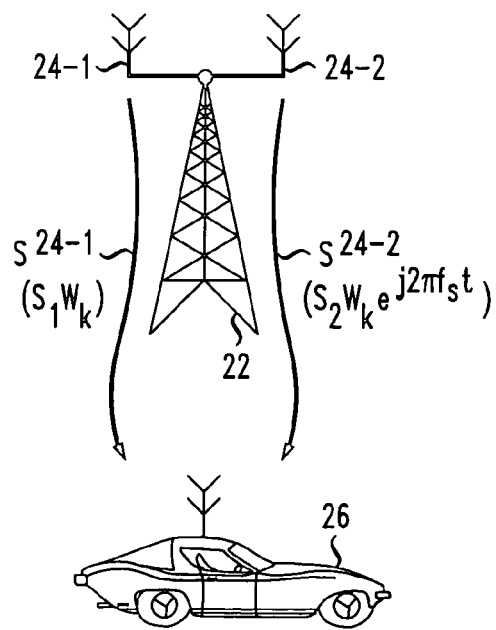
FIG. 2 depicts a wireless communication system employing phase sweep transmit diversity in accordance with the prior art.
Figure 3:
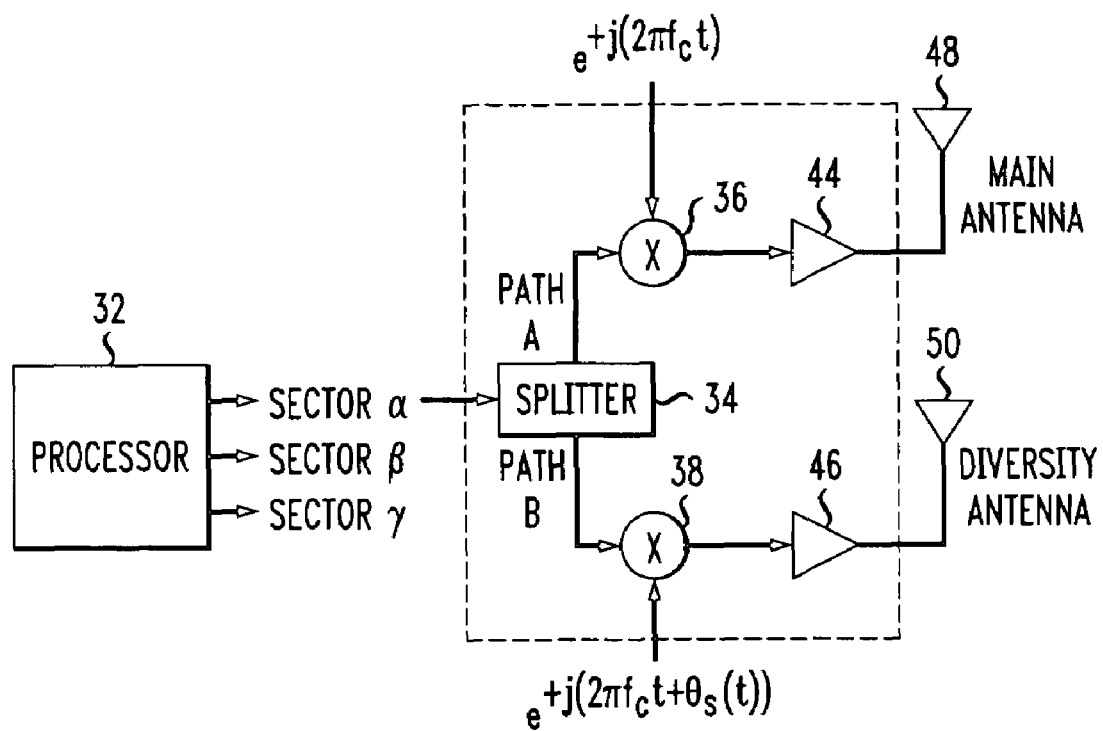
FIG. 3 depicts a base station employing code division multiple access (CDMA) and a form of phase sweep transmit diversity (PSTD) referred to herein as biased PSTD in accordance with the present invention.

FIG. 3 depicts a base station 30 employing code division multiple access (CDMA) and a form of phase sweep transmit diversity (PSTD) referred to herein as biased PSTD in accordance with the present invention. Biased PSTD involves transmitting a signal and a frequency swept version of the same signal over diversity antennas at different power levels to reduce the depths of nulls. Advantageously, biased PSTD is backwards compatible from the perspective of mobile-stations and does not degrade performance as much as PSTD in additive white gaussan noise (AWGN) conditions. CDMA is well-known in the art.

Base station 30 provides wireless communication services to mobile-stations, not shown, in its associated geographical coverage area or cell, wherein the cell is divided into three sectors $\alpha$, $\beta$, $\gamma$. Base station 30 includes a transmission architecture that biased PSTD, as will be described herein.

Base station 30 comprises a processor 32, a splitter 34, multipliers 36, 38, amplifiers 44, 46, and a pair of diversity antennas 48, 50. Note that base station 30 also includes configurations of splitters, multipliers, amplifiers and antennas for sectors $\beta$, $\gamma$ that are identical to those for sector a. For simplicity sake, the configurations for sectors $\beta$, $\gamma$ are not shown. Additionally, for discussion purposes, it is assumed that signals $S_k$ are intended for mobile-stations k located in sector $\alpha$ and, thus, the present invention will be described with reference to signals $S_k$ being processed for transmission over sector $\alpha$.

Processor 32 includes software for processing signals $S_k$ in accordance with well-known CDMA techniques to produce an output signal $S_{k-1}$. Note that, in another embodiment, processor 32 is operable to process signals $S_k$ in accordance with a multiple access technique other than CDMA, such as time or frequency division multiple access.

Signal $S_{k-1}$ is split by splitter 34 into signals $S_{k-1}(a)$, $S_{k-1}(b)$ and processed along paths A and B, respectively, by multipliers 36, 38, and amplifiers 44, 46 in accordance with bias PSTD techniques, wherein signal $S_{k-1}(a)$ is identical to signal $S_{k-1}(b)$ in terms of data. In one embodiment, signal $S_k$ is unevenly power split by splitter 34 such that the power level of signal $S_{k-1}(a)$ is higher than the power level of signal $S_{k-1}(b)$. For example, signal $S_{k-1}$ is power split such that signal $S_{k-1}(a)$ gets 5/8 of signal $S_{k-1}$'s power and signal $S_{k-1}(b)$ gets 3/8 of signal $S_{k-1}$'s power, i.e., $S_{k-1}(a) = \sqrt{5/8}(S_{k-1})$ and $S_{k-1}(b) = \sqrt{3/8}(S_{k-1})$. In another example, signal $S_{k-1}$ is power split such that signal $S_{k-1}(a)$ gets 2/3 of signal $S_{k-1}$'s power and signal $S_{k-1}(b)$ gets 1/3 of signal $S_{k-1}$'s power. In one embodiment, signal $S_{k-1}$ is unevenly power split by splitter 34 such that the power level of signal $S_{k-1}(b)$ is higher than the power level of signal $S_{k-1}(a)$, or signal $S_{k-1}$ is evenly power split into signals $S_{k-1}(a)$, $S_{k-1}(b)$. Signal $S_{k-1}(a)$ and carrier signal $e^{j2\pi f_c t}$ are provided as inputs into multiplier 36 to produce signal $S_{36}$, where $S_{36} = S_{k-1}(a) e^{j2\pi f_c t}$, $e^{j2\pi f_c t} = \cos(2\pi f_c t) + j \sin(2\pi f_c t)$, $f_c$ represents a carrier frequency and t represents time.

Signal $S_{k-1}(b)$, phase sweep frequency signal $e^{j\Theta_s(t)}$ and carrier signal $e^{j2\pi f_c t}$ are provided as inputs into multiplier 38 where signal $S_{k-1}(b)$ is frequency phase swept with signal $e^{j\Theta_s(t)}$ and modulated onto carrier signal $e^{j2\pi f_c t}$ to produce signal $S_{38} = S_{k-1}(b) e^{j2\pi f_c t} e^{j\Theta_s(t)}$, wherein $\Theta_s = 2\pi f_s t$, $e^{j\Theta_s(t)} = \cos(2\pi f_s t) + j \sin(2\pi f_s t)$ and $f_s$ represents a phase sweep frequency.

Signals $S_{36}$, $S_{38}$ are amplified by amplifiers 44, 46 to produce signals $S_{44}$ and $S_{46}$ for transmission over antennas 48, 50, respectively, where signal $S_{44} = A_{44} S_{k-1}(a) e^{j2\pi f_c t}$, $S_{46} = A_{46} S_{k-1}(b) e^{j2\pi f_c t} e^{j\Theta_s(t)}$, $A_{44}$ represents the amount of gain associated with amplifier 44 and $A_{46}$ represents the amount of gain associated with amplifier 46.

In one embodiment, the amounts of gain $A_{44}$, $A_{46}$ are equal. In this embodiment, signal $S_{k-1}$ is split by splitter 34 such that the power level of signal $S_{k-1}(a)$ is higher than the power level of signal $S_{k-1}(b)$, or vice-versa, so that differences in power level between signals $S_{44}$ and $S_{46}$ are not as large compared to an even power split of signal $S_{k-1}$.

In another embodiment, the amounts of gain $A_{44}$, $A_{46}$ are different and related to how splitter 34 power splits signal $S_{k-1}$. For example, the amount of gain $A_{44}$, $A_{46}$ applied to signals $S_{36}$, $S_{38}$ should be an amount that would cause the power levels of signals $S_{44}$ and $S_{46}$ to be approximately equal. For purposes of this application, power levels are "approximately equal" when the power levels are within 10% of each other. In another example, the signal, e.g., $S_{36}$ or $S_{38}$, associated with a greater power level is amplified more than the other signal.

In the case where signal $s_{\alpha-1}$ and/or signals $S_{36}$, $S_{40}$ are not biased or unevenly split or amplified, STS performance will degrade because signal $S_{44}$ will be transmitted at approximately 1/3 of the power at which signal $S_{46}$ will be transmitted. Advantageously, biasing or unevenly splitting signal $s_{\alpha-1}$ and/or biasing or unevenly amplifying signals $S_{36}$, $S_{40}$ mitigates this degradation to STS performance relative to the case where neither signal $s_{\alpha-1}$ nor signals $S_{36}$, $S_{40}$ are biased or unevenly split or amplified.

Although the present invention has been described in considerable detail with reference to certain embodiments, other versions are possible. Therefore, the spirit and scope of the present invention should not be limited to the description of the embodiments contained herein.

We claim:

1. A method of signal transmission comprising the steps of:
    splitting a signal $s_1$ into signals $s_1(a)$ and $s_1(b)$, wherein the signal $s_1$ is split unevenly such that the signal $s_1(a)$ has an associated power level greater than a power level associated with the signal $s_1(b)$; and
    phase sweeping the signal $s_1(b)$ using a phase sweep frequency signal to produce a phase swept signal $s_1(b)$.

2. The method of claim 1 comprising the additional steps of:
   amplifying the signal $s_1(a)$ to produce an amplified signal $s_1(a)$; and
   amplifying the phase swept signal $s_1(b)$ to produce an amplified phase swept signal $s_1(b)$.

3. The method of claim 2, wherein power levels associated with the amplified signal $s_1(a)$ and the amplified phase swept signal $s_1(b)$ are approximately equal.

4. The method of claim 2, wherein the signal $s_1(a)$ and phase swept signal $s_1(b)$ are amplified an equal amount.

5. The method of claim 2, wherein the signal $s_1(a)$ is amplified an amount greater than an amount phase swept signal $s_1(b)$ is amplified.

6. A method of signal transmission comprising the steps of:
   splitting a signal $S_1$ into signals $s_1(a)$ and $s_1(b)$, wherein the signal $S_1$ is split unevenly such that the signal $s_1(a)$ has an associated power level greater than a power level associated with the signal $s_1(b)$; and
   phase sweeping the signal $s_1(a)$ using a phase sweep frequency signal to produce a phase swept signal $s_1(a)$.

7. The method of claim 6 comprising the additional steps of:
   amplifying the signal $s_1(b)$ to produce an amplified signal $s_1(b)$; and
   amplifying the phase swept signal $s_1(a)$ to produce an amplified phase swept signal $s_1(a)$.

8. The method of claim 7, wherein power levels associated with the amplified signal $s_1(b)$ and the amplified phase swept signal $s_1(a)$ are approximately equal.

9. The method of claim 7, wherein the signal $s_1(b)$ and phase swept signal $s_1(a)$ are amplified an equal amount.

10. The method of claim 7, wherein the signal $s_1(b)$ is amplified an amount greater than an amount phase swept signal $s_1(a)$ is amplified.

11. A base station comprising:
    a splitter for splitting a signal $s_1$ into signals $s_1(a)$ and $s_1(b)$, wherein the signal $s_1$ is split unevenly such that the signal $s_1(a)$ has an associated power level greater than a power level associated with the signal $s_1(b)$; and
    a multiplier for phase sweeping the signal $s_1(b)$ using a phase sweep frequency signal to produce a phase swept signal $s_1(b)$.

12. The base station of claim 11 further comprising:
    a first amplifier for amplifying the signal $s_1(a)$ to produce an amplified signal $s_1(a)$; and
    a second amplifier for amplifying the phase swept signal $s_1(b)$ to produce an amplified phase swept signal $s_1(b)$.

13. The base station of claim 12, wherein power levels associated with the amplified signal $s_1(a)$ and the amplified phase swept signal $s_1(b)$ are approximately equal.

14. The base station of claim 12, wherein the signal $s_1(a)$ and phase swept signal $s_1(b)$ are amplified an equal amount.

15. The base station of claim 12, wherein the signal $s_1(a)$ is amplified an amount greater than an amount phase swept signal $s_1(b)$ is amplified.

16. A base station comprising:
    a splitter for splitting a signal $s_1$ into signals $s_1(a)$ and $s_1(b)$, wherein the signal $s_1$ is split unevenly such that the signal $s_1(a)$ has an associated power level greater than a power level associated with the signal $s_1(b)$; and
    a multiplier for phase sweeping the signal $s_1(a)$ using a phase sweep frequency signal to produce a phase swept signal $s_1(b)$.

17. The base station of claim 16 comprising the additional steps of:
    a first amplifier for amplifying the signal $s_1(b)$ to produce an amplified signal $s_1(b)$; and
    a second amplifier for amplifying the phase swept signal $s_1(a)$ to produce an amplified phase swept signal $s_1(a)$.

18. The base station of claim 17, wherein power levels associated with the amplified signal $s_1(b)$ and the amplified phase swept signal $s_1(a)$ are approximately equal.

19. The base station of claim 17, wherein the signal $s_1(b)$ and phase swept signal $s_1(a)$ are amplified an equal amount.

20. The base station of claim 17, wherein the signal $s_1(b)$ is amplified an amount greater than an amount phase swept signal $s_1(a)$ is amplified.

* * * * *